(No Model.) 3 Sheets—Sheet 1.
W. B. MAIN & C. H. WILSON.
APPARATUS FOR MARKING CLOTH.
No. 424,717. Patented Apr. 1, 1890.
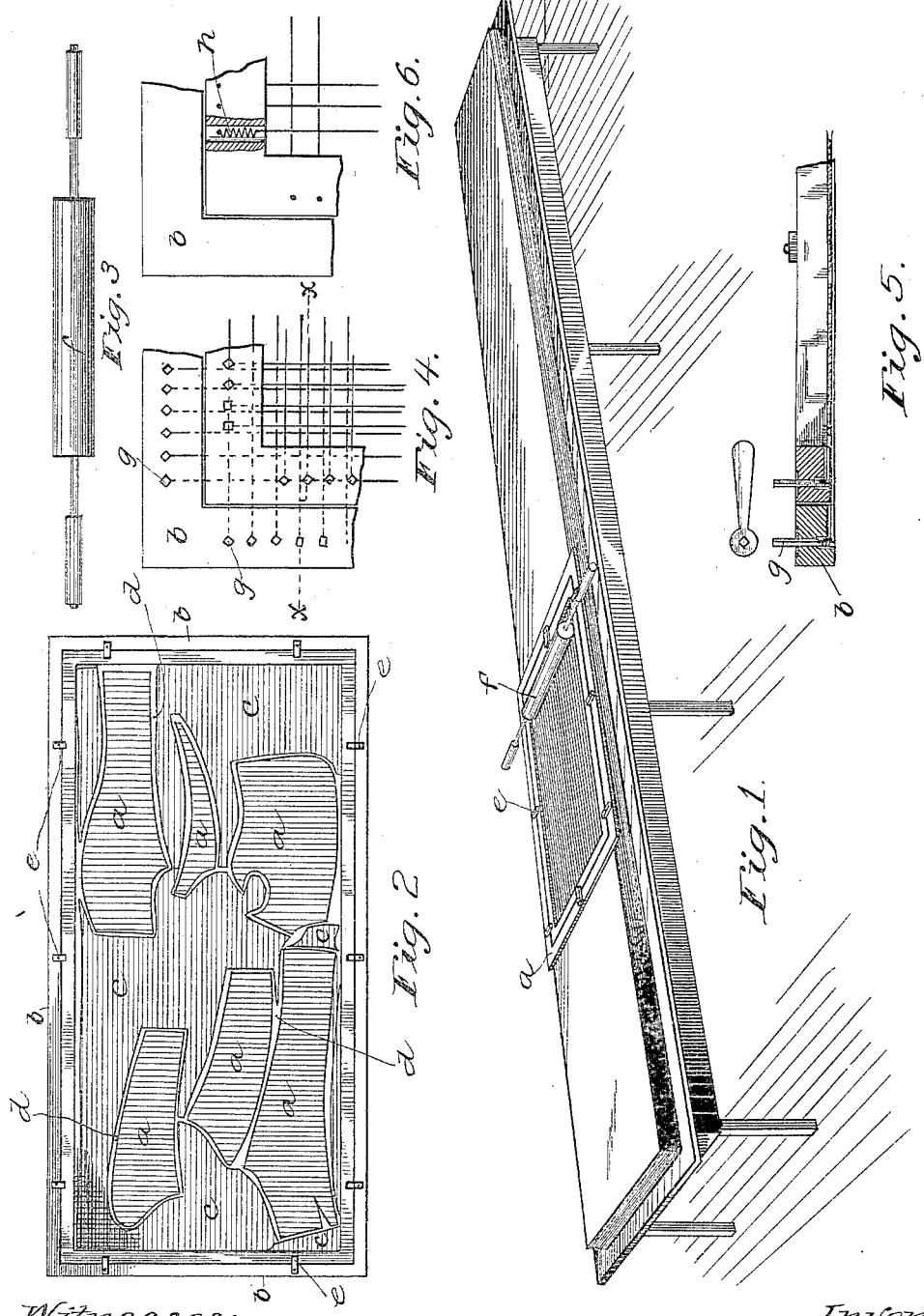
Witnesses:
Chas. G. Hawley
Ella Edler
Inventors.
Charles H. Wilson
William B. Main.
By George P. Barton
Attorney.

(No Model.) 3 Sheets—Sheet 2.
W. B. MAIN & C. H. WILSON.
APPARATUS FOR MARKING CLOTH.
No. 424,717. Patented Apr. 1, 1890.
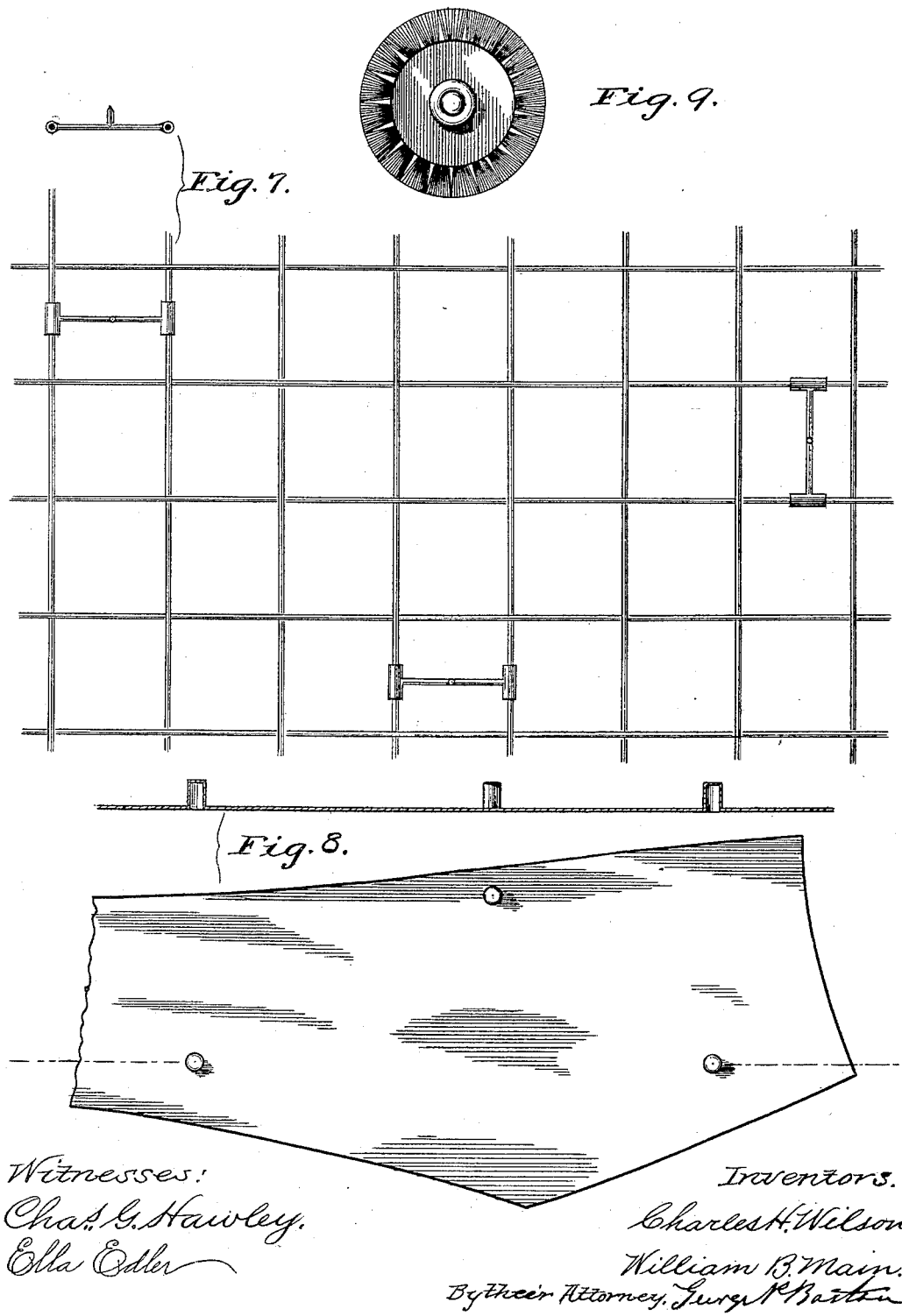
Witnesses:
Chas. G. Hawley.
Ella Edler
Inventors.
Charles H. Wilson
William B. Main.
By their Attorney, George P. Barton (No Model.) 3 Sheets—Sheet 3.

W. B. MAIN & C. H. WILSON.
APPARATUS FOR MARKING CLOTH.

No. 424,717. Patented Apr. 1, 1890.

Witnesses:
Chas. G. Hawley.
Ella Edler

Inventors.
Charles H. Wilson
William B. Main
By George P. Barton
Attorney.

N. PETERS, Photo-Lithographer, Washington, D. C.

ized and secured firmly in place upon the lower holder. This may be done by soldering the

UNITED STATES PATENT OFFICE.

WILLIAM B. MAIN AND CHARLES H. WILSON, OF CHICAGO, ILLINOIS.

APPARATUS FOR MARKING CLOTH.

SPECIFICATION forming part of Letters Patent No. 424,717, dated April 1, 1890.

Application filed October 8, 1888. Serial No. 287,525. (No model.)

*To all whom it may concern:*

Be it known that we, WILLIAM B. MAIN and CHARLES H. WILSON, citizens of the United States, residing at Chicago, in the county of Cook and State of Illinois, have invented a certain new and useful Improvement in Methods and Apparatus for Marking Cloth, of which the following is a full, clear, concise, and exact description, reference being had to the accompanying drawings, forming a part of this specification.

Our invention relates to apparatus for marking cloth for cutting, as is required in the manufacture of clothing.

Heretofore it has been common to place several thicknesses of cloth upon the table—sometimes twenty or thirty thicknesses—and mark the patterns thereon by hand. Sometimes the patterns are laid upon the top of the cloth and the marker with a piece of chalk marks around the patterns. It is evident, however, that by any hand method of marking mistakes will frequently arise, and then considerable time is necessarily consumed.

By our apparatus the marking becomes mechanical, and may be done by those having little skill.

Our invention consists in placing the true and false patterns in proper position upon the cloth to be marked, the spaces between the patterns, except near the edges, being covered by false patterns and rolling the marking substance over the patterns thus placed, and thereby forcing or scattering the marking substance in the spaces between the true and false patterns upon the cloth below.

Our invention also consists in the apparatus hereinafter described for doing this work. Our invention will be readily understood by reference to the accompanying drawings, in which—

Figure 10:
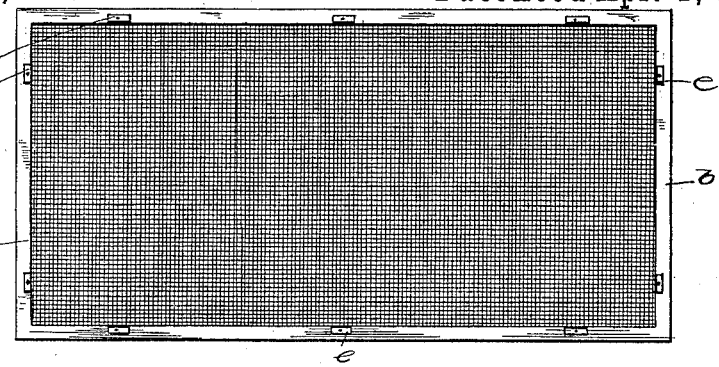
Figure 11:
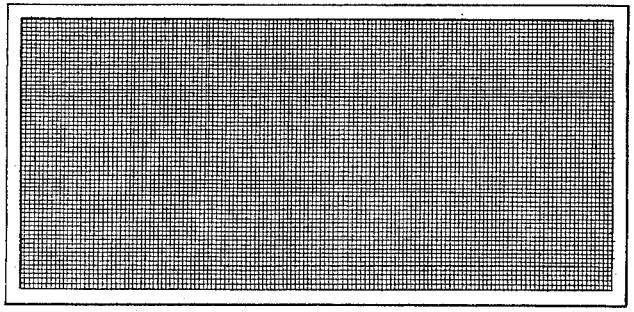
Figure 12:
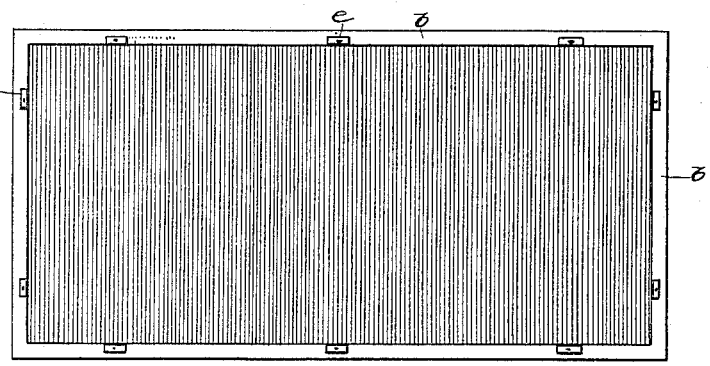
Figure 13:
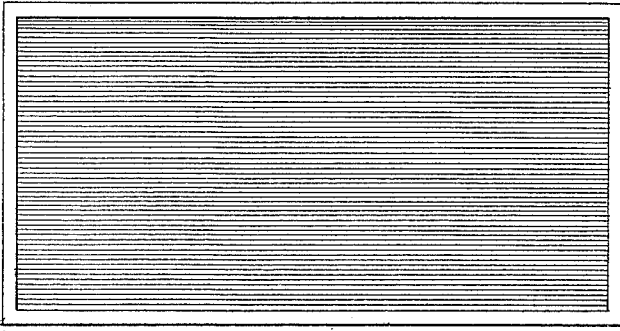

Figure 1 is a perspective view of a table with cloth placed thereon and our marking apparatus in position thereon. Fig. 2 is a plan view showing the true and false patterns with the slots or spaces between them through which the mixture of chalk and water or other marking substance is applied to the cloth. Fig. 3 is a detail view of a roller, which, if desired, may be in the form of a brush, and adapted to be rolled over the patterns, so as to force the marking material with which the roller or brush may be saturated into the spaces between the patterns. Figs. 4 and 5 are detail views showing the preferable manner of tightening the wires of the screens or holders. Fig. 6 shows a modification in which a spiral spring is provided at the end of each wire for holding the wires taut. Fig. 7 is a view showing spurs in the lower holder adapted to pierce the paper patterns, so as to hold them in place. Fig. 8 is a view of a metallic pattern provided with projections stamped thereon, which pass through the meshes or between the wires of one of the screens. Fig. 9 is a view of the roller provided with bristles. Fig. 10 is a plan of the lower screen of the holder, the wire of the netting being woven and running in both directions. Fig. 11 is a view of the upper screen provided with the same kind of wire-netting. Figs. 12 and 13 are plan views of the lower and upper screens, respectively, provided each with wires run in one direction only, the wires, however, being so arranged as to cross each other at right angles to form meshes when the upper screen is placed upon the lower.

Like parts are indicated by similar letters of reference throughout the different figures.

The patterns must be held close to the cloth, in order that the marking material may be readily applied to the cloth in the slots between the patterns. We therefore preferably first lay the true patterns, as *a*, upon the lower screen *b*. We then place the false patterns *c* about the true patterns, as shown in Fig. 2, so as to leave slots or spaces *d* open between them. The upper screen is then placed over the patterns and secured in place by buttons *e* or otherwise, so as to hold the patterns between the screens, as shown in Figs. 1, 2, and 5. The holder containing the patterns is then placed upon the cloth, as shown in Fig. 1. We have then the patterns placed directly upon the cloth. The spaces or slots between the patterns are of the proper outline, and it is only necessary to force the marking material into the slots to indicate the shape of the pieces to be cut from the cloth. This may be done by sprinkling flour or chalk through the spaces, or it may be done by means of a roller *f*, with felt or some fleecy substance, or provided with bristles adapted to hold the marking substance and force a portion thereof through the upper screens, as shown in Fig. 1.

In Figs. 4 and 5 we have shown screws *g*, like the screws used for holding and adjusting the wires of a piano, to which the wires of the screens are attached.

In Fig. 6 we have shown a modification in which spiral spring *h* is used at the end of each wire. In this manner the different wires may be held taut without the need of adjustment or tightening from time to time.

The means for applying the marking material may be varied, as desired. We have sometimes used a brush for this purpose. We have mentioned a mixture of chalk and water as a suitable marking material. Pulverized chalk or starch might, however, be successfully employed, or, in short, any substance that is adapted to be applied to the goods in the slots or spaces.

We have referred to true and false patterns, by true patterns meaning those pieces which correspond to the pieces to be cut from the cloth to form the garment, and by false patterns those pieces placed between the true patterns to protect the cloth not covered by the true patterns. It is evident, however, that false patterns would not be required where the true patterns are of such shape that they may be laid in proper position to substantially cover the cloth. Therefore we do not limit our invention to any particular form or disposition of the patterns, whether true or false, so long as they are so disposed as to leave spaces between them through which the marking material may be applied to the cloth.

One or more patterns in the form may be removed at will and others substituted in the place thereof.

If desired, projections may be provided on the paper patterns the same as upon the metallic patterns, as shown in Fig. 8. Usually the patterns will be held in place by the friction of the upper and lower screens without the aid of spurs in the lower screen or projections in the patterns. It is evident, however, that the patterns with the projections may be used in screens having the spurs, if occasion requires.

Our invention admits of various modifications that would readily suggest themselves to those skilled in the art, and we do not, therefore, limit ourselves to the construction shown.

Having thus described our invention, we claim as new and desire to secure by Letters Patent—

1. The combination, with the upper and lower screens, of true and false patterns placed between the same, substantially as shown and described.

2. The combination, with the upper and lower screens, of patterns held in position between said screens over the article to be marked, whereby spaces are left between the patterns through which the marking substance may be forced, substantially as and for the purpose specified.

3. The combination, with the lower and upper screens provided with means for adjusting the tension of the wires thereof, of patterns placed between the screens, substantially as shown and described.

4. The combination, with the lower screen provided with spurs, of patterns placed thereon, said patterns being provided with projections extending through the meshes, whereby the patterns are held in place, substantially as and for the purpose specified.

5. The combination, with the upper and lower screens, of patterns with projections inserted between the wires of one of the screens, whereby the patterns are held in place, substantially as described.

6. The holder consisting of the lower screen provided with spurs, patterns placed thereon, and the upper screen resting upon the patterns, substantially as described.

7. An apparatus for marking cloth, consisting in a holder for the patterns having openings or meshes, said holder being adapted to contain several patterns in close proximity to the cloth to be marked, and means for forcing marking material through the holder between the patterns upon the cloth, substantially as and for the purpose specified.

In witness whereof we hereunto subscribe our names this 4th day of October, A. D. 1888.

WILLIAM B. MAIN.
CHARLES H. WILSON.

Witnesses:
GEORGE P. BARTON,
CHAS. G. HAWLEY.